United States Patent
Hahn

(10) Patent No.: US 7,361,632 B2
(45) Date of Patent: Apr. 22, 2008

(54) WATER SOLUBLE GLASS AS CORROSION PROTECTOR IN DISHWASHING MACHINES

(75) Inventor: Karlheinz Ulrich Gerhard Hahn, Otterstadt (DE)

(73) Assignee: Reckitt Benckiser N.V., Hoofddorp (NL)

( * ) Notice: Subject to any disclaimer, the term of this patent is extended or adjusted under 35 U.S.C. 154(b) by 252 days.

(21) Appl. No.: 11/188,916

(22) Filed: Jul. 25, 2005

(65) Prior Publication Data

US 2005/0253116 A1 Nov. 17, 2005

Related U.S. Application Data

(62) Division of application No. 10/468,669.

(30) Foreign Application Priority Data

Feb. 22, 2001 (GB) .................. 0104347.0

(51) Int. Cl.
 - *C03C 3/16* (2006.01)
 - *C03C 3/12* (2006.01)
 - *C11D 7/16* (2006.01)
 - *B08B 9/20* (2006.01)

(52) U.S. Cl. .................. 510/227; 510/514; 252/387; 134/25.1; 134/25.2; 501/45; 501/46; 501/47; 501/48; 501/49; 501/73

(58) Field of Classification Search .................. 510/227, 510/515
See application file for complete search history.

(56) References Cited

U.S. PATENT DOCUMENTS

| | | | | | |
|---|---|---|---|---|---|
| 2,337,856 | A | * | 12/1943 | Owen et al. ............... | 148/263 |
| 3,255,117 | A | * | 6/1966 | Knapp et al. ............. | 510/227 |
| 3,284,368 | A | * | 11/1966 | Hatch ..................... | 252/389.2 |
| 3,432,428 | A | * | 3/1969 | Robertson et al. ......... | 210/668 |
| 3,589,858 | A | * | 6/1971 | Ralston et al. ............ | 422/18 |
| 3,677,820 | A | * | 7/1972 | Rutkowski ............... | 134/25.2 |
| 3,885,973 | A | * | 5/1975 | Ray et al. ................ | 501/45 |
| 4,518,429 | A | * | 5/1985 | Drake et al. ............. | 106/14.39 |
| 4,908,148 | A | * | 3/1990 | Caravajal et al. ......... | 510/514 |
| 6,622,738 | B2 | * | 9/2003 | Scovell ................... | 134/61 |

FOREIGN PATENT DOCUMENTS

| | | | |
|---|---|---|---|
| EP | 1116698 A1 | * | 7/2001 |
| GB | 2099415 A | * | 12/1982 |
| GB | 2178422 A | * | 2/1987 |
| WO | WO 9854104 A1 | * | 12/1998 |
| WO | WO 00/392569 | * | 7/2000 |

* cited by examiner

*Primary Examiner*—Joseph D. Anthony
(74) *Attorney, Agent, or Firm*—Norris, McLaughlin & Marcus, PA

(57) ABSTRACT

A zinc-containing, water-soluble glass composition comprising from 41 to 54 mole % of $P_2O_5$, 10 to 30 mole % of alkali oxides, up to 5 mole % of $SO_3$ and up to 25 mole % of ZnO.

20 Claims, No Drawings

WATER SOLUBLE GLASS AS CORROSION PROTECTOR IN DISHWASHING MACHINES

The invention is related to a novel zinc-containing, water-soluble glass composition, the use thereof for inhibition of corrosion of glassware in an automatic dishwashing process and related processes.

Corrosion of glassware in cleaning and/or rinsing cycles of an automatic dishwashing machine is a well-known problem. It is believed that corrosion of glassware can be seen as two separate phenomena. On the one hand, corrosion is obviously caused by the leakage of minerals from the glass composition, accompanied by the hydrolysis of the silicate network. On the other hand, deposition of silicate material on the glassware may take place. Those phenomena will result, after a certain number of cleaning cycles, to damages on the glassware, such as turbidity, scratches, streaks and the like.

It is known that silicate compounds could be active against leakage of minerals from glass compositions. However, deposition of silicate material on the surface of glassware would be increased.

There are different approaches in the prior art proposed for the solution of above identified problems.

One approach is the use of zinc, either in metallic form (U.S. Pat. No. 3,677,820) or in the form of zinc compounds. The use of soluble zinc salts for inhibition of corrosion of glassware in automatic dishwashing processes is, for example, disclosed in U.S. Pat. No. 3,255,117.

There are, however, various disadvantages of the use of soluble zinc salts, in particular formation of precipitates of insoluble zinc salts with other ions in the wash liquor or rinse water. Thus, the use of insoluble zinc compounds for the inhibition of corrosion of glassware in automatic dishwashing processes has been proposed in European Patent Application EP 0 383 480 A1, EP 0 383 482 A1 and EP 0 387 997 A1. More particularly insoluble zinc salts such as zinc silicate, zinc carbonate, zinc oxide, basic zinc carbonate, zinc hydroxide, zinc oxalate, zinc monophosphate and zinc pyrophosphate have been proposed.

With these prior art compositions, it is disadvantageous that, due to the low solubility, or even insolubility, of the zinc compounds, it is difficult, if not impossible, to ensure an continuously sufficient amount of active corrosion inhibiting agent in the wash liquor or rinse water. Moreover, due to the high specific density of above mentioned insoluble zinc salts, separation problems of powder mixtures or deposition problems with liquid mixtures have occurred.

WO 97/11151 discloses glassy particles containing agents useful for laundry and cleaning products. Amongst others, material care agents are disclosed such as usual corrosion inhibitors such as paraffin oil, benzotriazole, and the like. The agents are encapsulated in glassy particles derived from at least partially water-soluble hydroxylic compounds such as sucrose, glucose and maltodextrin. No zinc-containing water-soluble glass compositions are disclosed therein.

WO 00/39259 discloses the use of water-soluble glasses as corrosion protection for glassware. This water-soluble glass composition comprises at least one compound, which in cleaning and/or rinsing cycles of a dishwashing machine releases a corrosion inhibiting agent. The solubility of the glass is defined by a mass loss of at least 0.5 mg under specified conditions. Amongst others, zinc-containing glasses are disclosed. In preferred embodiments, the glass building component is preferably phosphorous pentoxide and additionally comprises at least one alkali oxide. The examples disclosed therein are characterised by a content of $SO_3$ of around 20%.

However, the glass composition disclosed in WO 00/39259 which is based on ZnO (which is presently believed to be a very effective glassware-protecting agent) turned out to be unsatisfactory for manufacture of a consumer appealing product. In fact, although it is possible, under certain conditions, to manufacture a transparent glass from the composition, this glass looses its transparency rapidly after some dishwashing cycles developing an unappealing appearance.

Related compositions obtained by variation of the components resulted in problems of producing a transparent glass in a continuous manufacturing process, which is required for production of large amounts of the glass product. In such processes, the raw materials for glasses are molten in a furnace at temperatures where they form a liquid glass melt with viscosities from 1 to 1000 dPas (100 dPas characterises the well know "Melting Point") Afterwards the melt is continuously slowly cooled down and remains during a long period working temperature range where it shows a viscosity of $10^4$ to $10^8$ dPas. This is called the processing range of glass, determined by the "Working Point", where the liquid glass shows a viscosity of $10^4$ dPas and the "Littleton Point", $10^{7.6}$ dPas, where the shape of glass is formed by pressing or/and blowing. Finally, the composition reaches the glass transition temperature range ($T_g$) where its viscosity increases becoming a solid material. In this range ("Annealing Point", viscosity of $10^{13}$ dPas and "Strain Point" $10^{14.6}$ dPas) tensions could be minimised due to annealing.

The time during which the glass remains within the working temperature range facilitates devitrification of the glass formulation. In non-continuous processes (such as those employed in the manufacture of optical glasses or glasses used as fillers for plastics), the glass is quickly cooled down after it comes out of the furnace and therefore devitrification does usually not occur. The formulation of the glass is, however, much more critical, when manufacturing transparent glasses in a continuous process with above described prolonged cooling down periods.

Thus, it is an object of the present invention to provide for a zinc-containing, water-soluble glass composition for use as a corrosion inhibiting product in an automatic dishwashing process which allows production of transparent glass in a continuous manufacturing process which glass maintains its transparency upon dissolution over a sufficient number of dishwashing cycles.

This object is solved by a zinc-containing, water-soluble glass composition comprising from 41 to 54 mole % of $P_2O_5$, 10 to 30 mole % of alkali oxides, up to 5 mole % of $SO_3$ and up to 25 mole % of ZnO.

In a preferred embodiment of the inventive glass composition not more than 40 mole %, preferably not more than 20 mole %, most preferably not more than 10 mole % of the total amount of alkali oxides in the glass formulation is constituted by one or more members of the group consisting of $Li_2O$ and $Na_2O$.

Preferably, the inventive composition additionally comprises at least one alkaline-earth oxide with a total amount of alkaline-earth oxides of less than 20 mole %, preferably less than 10 mole % and, most preferably less than 5 mole %.

Also preferably, the inventive composition additionally comprises at least one oxide of antimony or arsenic with a total amount of such oxides of less than 5 mole %, preferably less than 3 mole %, most preferably less than 1 mole %.

The inventive composition may comprise oxides of an element from the group consisting of silicium, germanium, tin and lead with a total amount of such oxides of less than 10 mole %, preferably less than 5 mole %, most preferably less than 3 mole %, wherein no single of such oxides is present in an amount exceeding 5 mole %, more preferably 2 mole %.

Even more preferably, the inventive composition additionally comprises at least one oxide of an element selected from the group consisting of aluminium and boron with a total amount of such oxides of from 0.1 to 10 mole %, preferably from 0.2 to 5 mole %, most preferably from 0.3 to 3 mole %.

It is also preferred that the glass compositions according to the present invention do not comprise more than 0.5 mole % of oxides of elements from the group IIIb of the Periodic System of Elements (i.e. the group comprising Scandium, Yttrium, the Lanthanide series and the Actinide series).

The presently most preferred composition according to the invention consists of from 41 to 54 mole % of $P_2O_5$, from 10 to 30 mole % of alkali oxides, up to 5 mole % of $SO_3$, up to 25 mole % of ZnO, less than 5 mole % of alkaline-earth oxides, and from 0.3 to 3 mole % of oxides of elements selected from the group consisting of silicon, aluminium and boron.

In the most preferred embodiment of the invention, the composition is present in the form of a transparent shaped body, preferably manufactured by continuous glass manufacturing processes like casting, pressing or blowing.

In an alternative, the composition is present in a comminuted form, preferably either manufactured by breaking of thin glass plates or by milling, wherein the milled glass most preferably has an average particle size of not more than 500 microns.

The invention is specifically related to the use of the inventive glass composition for inhibition of corrosion of glassware in an automatic dishwashing process, particularly to the use of a transparent glass composition, which remains transparent upon dissolution.

Thus, the invention is also related to processes for inhibition of corrosion of glassware in an automatic dishwashing process, either characterised by contacting the glassware, in an automatic dishwashing machine, with wash liquor and/or rinse water containing an effective amount of the inventive composition, or by providing the composition, in particular in the form of a shaped body, such as a glass block drop casted and pressed in a continuous manufacturing process, at an appropriate place within an automatic dishwashing machine being accessible for the wash liquor and/or rinse water.

Very surprisingly, only the specific selection of components in their indicated ranges simultaneously fulfils the requirements of releasing ZnO during the dishwashing cycles in an amount enough to ensure glassware corrosion protection, providing for a dissolution rate of the glass enabling to use a block of reasonable weight for a reasonable number of washing cycles (for example, 40 g for 60 cycles), and allowing manufacture of a transparent glass block in an continuous manufacturing process which glass block does not loose its transparency during a sufficient number of dishwashing cycles.

Although a multitude of glass formulations is known from the prior art, we are presently not aware of any such composition with this specific choice of components in the specified ranges. In particular, above mentioned advantageous features enabling the desired use of the glass composition for manufacturing a consumer appealing glass product for inhibition of corrosion of glassware in automatic dishwashing has neither been anticipated nor obvious for someone skilled in the art from the prior art documents related to glass formulations.

The compositions as exemplified in the following Table have been produced in a continuous commercial glass pressing processing as outlined hereinabove. It is easily possible to manufacture shaped bodies of transparent glass with a weight of about 40 g. When used an automatic dishwashing machine, the glass block was completely dissolved after several dishwashing cycles. For example 1 a glass block with the dimensions (1×5×3) cm³ was completely dissolved after 60 cycles in the dishwasher, if you choose the conditions described in prEN 12875-1 with Calgonit Powerball Tab as detergent. No loss of transparency of the glass block was observed over this time period.

The glass corrosion inhibiting activity of these glass blocks were tested according the methods as described in detail in WO 00/39259. The results were found to be at least equal, in case of the composition according to Example 1 even significantly better.

TABLE

| Component | Exp. 1 [mole %] | Exp. 2 [mole %] | Exp. 3 [mole %] |
|---|---|---|---|
| $P_2O_5$ | 50 | 45 | 43 |
| $Na_2O$ | 1 | 0 | 0 |
| $Li_2O$ | 0 | 3 | 0 |
| $K_2O$ | 27.5 | 25 | 29 |
| ZnO | 14.5 | 15 | 19 |
| CaO | 3 | 5 | 0 |
| $SO_3$ | 0 | 4.5 | 3 |
| $Sb_2O_3$ | 0 | 0.5 | 0 |
| $SiO_2$ | 2 | 0 | 3 |
| $Al_2O_3$ | 0.5 | 0 | 1 |
| $B_2O_3$ | 1.5 | 2 | 2 |
| Total | 100 | 100 | 100 |

The features disclosed in the foregoing description, and the claims may, both separately and in any combination thereof, be material for realising the invention in diverse forms thereof.

The invention claimed is:

1. A process for the inhibition of corrosion of glassware in an automatic dishwashing process which comprises the step of:
    contacting said glassware in an automatic dishwashing process with a zinc-containing, water-soluble glass composition comprising:
    from 41 to 54 mole % of $P_2O_5$,
    10 to 30 mole % of alkali metal oxides,
    up to 5 mole % of $SO_3$ and
    up to 25 mole % of ZnO.

2. A process according to claim 1, wherein in the composition not more than 40 mole % of the total amount of alkali metal oxides in the composition is constituted by one or more members of the group consisting of $Li_2O$ and $Na_2O$.

3. A process according to claim 1, wherein the composition additionally comprises at least one alkaline-earth oxide with a total amount of alkaline-earth oxides of less than 20 mole %.

4. A process according to claim 1, wherein the composition additionally comprises least one oxide of antimony or arsenic present in the composition in an amount of less than 5 mole %.

5. A process according to claim 1, wherein the composition additionally comprises at least one oxide of an element from the group consisting of silicon, germanium, tin and lead present in the composition in an amount of with a total amount of such oxides of less than 10 mole %.

6. A process according to claim 1, wherein the composition additionally comprises at least one oxide of an element selected from the group consisting of silicon, aluminium and boron present in the composition in an amount of from 0.1 to 10 mole %.

7. A process according to claim 1, wherein the composition does not comprise more than 0.5 mole % of oxides of elements from the group IIIb of the Periodic System of Elements.

8. A process according to claim 1, wherein the composition comprises:
   from 41 to 54 mole % of $P_2O_5$,
   from 10 to 30 mole % of alkali metal oxides,
   up to 5 mole % of $SO_3$,
   up to 25 mole % of ZnO,
   less than 5 mole % alkaline-earth oxides, and
   from 0.3 to 3 mole % of oxides of elements selected from the group consisting of silicon, aluminium and boron.

9. A process according to claim 1, wherein the composition is present in the form of a transparent shaped body.

10. A process according to claim 9, wherein the composition is present in the form of a transparent shaped body manufactured by continuous glass manufacturing processes.

11. A process according to claim 1, wherein the composition is present in comminuted form.

12. A process according to claim 11, wherein the composition is manufactured by breaking thin glass plates.

13. A process according to claim 11, wherein the composition is manufactured by a process which includes a milling step.

14. A process according to claim 13, wherein the milled glass has an average particle size of not more than 500 microns.

15. A process for the inhibition of corrosion of glassware in an automatic dishwashing process characterised by:
   providing a zinc-containing, water-soluble glass composition comprising;
   from 41 to 54 mole % of $P_2O_5$,
   10 to 30 mole % of alkali metal oxides,
   up to 5 mole % of $SO_3$ and
   up to 25 mole % of ZnO;
at an appropriate place within an automatic dishwashing machine wherein the said composition is accessible to the wash liquor and/or rinse water.

16. A process for the inhibition of corrosion of glassware in an automatic dishwashing process according to claim 15 characterised by providing a zinc-containing, water-soluble glass composition comprising;
   from 41 to 54 mole % of $P_2O_5$,
   from 10 to 30 mole % of alkali metal oxides,
   up to 5 mole % of $SO_3$,
   up to 25 mole % of ZnO,
   less than 5 mole % alkaline-earth oxides, and
   from 0.3 to 3 mole % of oxides of elements selected from the group consisting of silicon, aluminium and boron;
at an appropriate place within an automatic dishwashing machine wherein the said composition is accessible to the wash liquor and/or rinse water.

17. A process for the inhibition of corrosion of glassware in an automatic dishwashing process characterised by:
   contacting the glassware, in an automatic dishwashing machine, with wash liquor and/or rinse water containing an effective amount of a zinc-containing, water-soluble glass composition comprising;
   from 41 to 54 mole % of $P_2O_5$,
   10 to 30 mole % of alkali metal oxides,
   up to 5 mole % of $SO_3$ and up to 25 mole % of ZnO.

18. A process for the inhibition of corrosion of glassware in an automatic dishwashing process according to claim 17 characterised by:
   contacting the glassware, in an automatic dishwashing machine, with wash liquor and/or rinse water containing an effective amount of a zinc-containing, water-soluble glass composition comprising;
   from 41 to 54 mole % of $P_2O_5$,
   from 10 to 30 mole % of alkali metal oxides,
   up to 5 mole % of $SO_3$,
   up to 25 mole % of ZnO,
   less than 5 mole % alkaline-earth oxides, and
   from 0.3 to 3 mole % of oxides of elements selected from the group consisting of silicon, aluminium and boron.

19. A process for the inhibition of corrosion of glassware in an automatic dishwashing process according to claim 15 characterised in that the zinc-containing, water-soluble glass composition is in the form of a transparent shaped body.

20. A process for the inhibition of corrosion of glassware in an automatic dishwashing process according to claim 15 characterised in that the zinc-containing, water-soluble glass composition is in a comminuted form.

* * * * *